United States Patent
Chowdhury et al.

(10) Patent No.: US 9,552,454 B2
(45) Date of Patent: Jan. 24, 2017

(54) CONCURRENT TIMING-DRIVEN TOPOLOGY CONSTRUCTION AND BUFFERING FOR VLSI ROUTING

(71) Applicant: Oracle International Corporation, Redwood City, CA (US)

(72) Inventors: Salim Chowdhury, Austin, TX (US); Akshay Sharma, Austin, TX (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/603,696

(22) Filed: Jan. 23, 2015

(65) Prior Publication Data

US 2015/0213188 A1 Jul. 30, 2015

Related U.S. Application Data

(60) Provisional application No. 61/930,968, filed on Jan. 24, 2014.

(51) Int. Cl.
*G06F 17/50* (2006.01)

(52) U.S. Cl.
CPC .................................. *G06F 17/5081* (2013.01)

(58) Field of Classification Search
CPC .............. G06F 17/5077; G06F 17/5072; G06F 2217/78; G06F 17/5081; G06F 17/509; G06F 2217/80; H04L 45/00; H04L 45/48
USPC .................................................. 716/110–116
See application file for complete search history.

(56) References Cited

U.S. PATENT DOCUMENTS

| 2004/0044979 A1* | 3/2004 | Aji | G06F 17/5077 716/113 |
| 2006/0288323 A1* | 12/2006 | Birch | G06F 17/5077 716/129 |
| 2008/0028352 A1* | 1/2008 | Birch | G06F 17/5077 716/112 |

OTHER PUBLICATIONS

G. Ajwani et al., FOARS: FLUTE Based Obstacle-Avoiding Rectilinear Steiner Tree Construction, IEEE Transactions on Computer-Aided Design of Integrated Circuits and Systems, vol. 30, No. 2, Feb. 2011, pp. 194-204.

C. J. Alpert et al., Buffered Steiner Trees for Difficult Instances, IEEE Transactions on Computer-Aided Design of Integrated Circuits and Systems, vol. 21, No. 1, Jan. 2002, pp. 3-14.

C. J. Alpert et al., Timing-Driven Steiner Trees Are (Practically) Free, 43rd ACM/IEEE Design Automation Conference, Jul. 2006, pp. 389-392.

(Continued)

*Primary Examiner* — Binh Tat
(74) *Attorney, Agent, or Firm* — Brooks Kushman P.C.

(57) ABSTRACT

A system and method for topology construction for long and complex fan-out networks such as encountered in microprocessors include a modified Steiner tree algorithm with concurrent buffering to reduce post-buffer power/delay cost for a spanning tree. The system and method may prune Hanan points prior to calling a buffering tool to insert buffers and insert non-Hanan branching points. Embodiments may also include dividing a device into a plurality of super unit blocks, performing routing within each of the plurality of super units using a single crossing Steiner tree algorithm to determine a corresponding port, and aligning corresponding ports of each super unit to provide routing between the plurality of super units.

14 Claims, 10 Drawing Sheets

(56) References Cited

OTHER PUBLICATIONS

M. Borah et al., An Edge-Based Heuristic for Steiner Routing, IEEE Transactions on Computer-Aided Design of Integrated Circuits and Systems, vol. 13, No. 12, Dec. 1994, pp. 1563-1568.

K. D. Boese et al., Rectilinear Steiner Trees With Minimum Elmore Delay, 31st ACM/IEEE Design Automation Conference, 1994, pp. 381-386.

C.K. Cheng et al., New Performance Driven Routing Techniques With Explicit Area/Delay Tradeoff and Simultaneous Wire Sizing, 33rd ACM Design Automation Conference, 1996, pp. 395-400.

C. Chu et al., FLUTE: Fast Loopup Table Based Rectilinear Steiner Minimal Tree Algorithm for VLSI Design, IEEE Transactions on Computer-Aided Design of Integrated Circuits and Systems, vol. 27, No. 1, Jan. 2008, pp. 70-83.

J. Cong et al., Interconnect Design for Deep Submicron ICs, IEEE, 1997, pp. 478-485.

J. Cong et al., Performance-Driven Interconnect Design Based on Distributed RC Delay Model, 30th ACM/IEEE Design Automation Conference, 1993, pp. 606-611.

J. Cong et al., Routing Tree Construction Under Fixed Buffer Locations, Design Automation Conference, 2000, pp. 379-384.

S. Dechu et al., An efficient Routing Tree Construction Algorithm With Buffer Insertion, Wire Sizing and Obstacle Considerations, IEEE Transactions on Computer-Aided Design of Integrated Circuits and Systems, vol. 24, No. 4, Apr. 2005, pp. 600-608.

J. Griffith et al., Closing the Gap: Near-Optimal Steiner Trees in Polynomial Time, IEEE Transactions on Computer-Aided Design of Integrated Circuits and Systems, vol. 13, No. 11, Nov. 1994, pp. 1351-1365.

M. Hrkic et al., Buffer Tree Synthesis With Consideration of Temporal Locality, Sink Polarity Requirements, Solution Cost, Congestion and Blockages, IEEE Transactions on Computer-Aided Design of Integrated Circuits and Systems, vol. 22, No. 4, Apr. 2003, pp. 481-491.

T. Huang et al., An Exact Algorithm for the Construction of Rectilinear Steiner Minimum Trees Among Complex Obstacles, Design Automation Conference, Jun. 2011, pp. 164-169.

T. Huang et al., Construction of Rectilinear Steiner Minimum Trees With Slew Constraints Over Obstacles, IEEE/ACM International Conference on Computer-Aided Design, Nov. 2012, p. 144-151.

A. B. Kahng et al., Q-Tree: A New Iterative Improvement Approach for Buffered Interconnect Optimization, IEEE Annual Symposium on VLSI, 2003, 6 pgs.

L. Li et al., Generation of Optimal Obstacle-Avoiding Rectilinear Steiner Minimum Tree, ACM International Conference on Computer-Aided Design, Nov. 2009, pp. 21-25.

L. Li et al., Obstacle-Avoiding Rectilinear Steiner Tree Construction, ACM International Conference on Computer-Aided Design, 2009, 6 pgs.

Y. Lin et al., Critical-Trunk-Based Obstacle-Avoiding Rectilinear Steiner Tree Routings and Buffer Insertion for Delay and Slack Optimization, IEEE Transactions on Computer-Aided Design of Integrated Circuits and Systems, vol. 30, No. 9, Sep. 2011, pp. 1335-1348.

M. Pan et al., A Novel Performance-Driven Topology Design Algorithm, Asia and South Pacific Design Automation Conference, 2007, pp. 244-249.

D. M. Warme, et al., Exact Solutions to Large-Scale Plane Steiner Tree Problems, 2000,2 pgs.

Y. Zhang et al., Reclaiming Over-the-IP-Block Routing Resources With Buffering-Aware Rectilinear Steiner Minimum Tree Construction, IEEE/ACM International Conference on Computer-Aided Design, Nov. 2012 pp. 137-143.

\* cited by examiner

— Signal Route   Macro Block
▫ Buffer         Cluster of Standard Cells

— Signal Route   Macro Block
▫ Buffer         Cluster of Standard Cells

— Signal Route ▫ Buffer
--- Fly Line ▨ Macro Block
◉ Hanan Point ⋯ Cluster of Standard Cells — Signal Route ▫ Buffer
--- Fly Line ▨ Macro Block
◉ Hanan Point ⋯ Cluster of Standard Cells

US 9,552,454 B2

CONCURRENT TIMING-DRIVEN TOPOLOGY CONSTRUCTION AND BUFFERING FOR VLSI ROUTING

CROSS-REFERENCE TO RELATED APPLICATION

This application claims the benefit of U.S. Provisional Application No. 61/930,968, filed Jan. 24, 2014, which is incorporated by reference herein in its entirety.

TECHNICAL FIELD

This disclosure relates to topology construction, such as used in microprocessor or other VLSI routing for example.

BACKGROUND

A rectilinear Steiner tree (RST) is a fundamental structure that may be used to model interconnects between nodes. A rectilinear Steiner minimum tree (RSMT) aims to minimize the wire length. Various algorithms have been developed to construct a RSMT. For example, BI1S, BOI and FLUTE are near-optimal RSMT heuristics while GeoSteiner is optimal with reasonable runtime for small trees. A large fraction of nets in multi-GHz microprocessors and other reasonably high frequency chips need buffering for mitigating large signal slew (transition time) and delay. Timing-driven Steiner tree construction is, thus, of paramount importance in these applications. Various approaches focus on the minimum (pre-buffer) delay routing tree (MDRT) problem, which minimizes a linear combination of delays at sinks Other approaches optimize the required arrival time at the driver with power/timing trade-offs and wire sizing. A minimum rectilinear Steiner arborescence (MRSA) (which is an RST such that each source-to-sink path is a shortest path) improves the performance (3%-5%) with slightly higher wire-length. However, buffering an optimized unbuffered tree may undo the order of sink criticalities. The path from the source to a critical sink may incur more delay due to the number of buffers placed in the path.

SUMMARY

A system for constructing an integrated circuit interconnect tree topology includes a microprocessor that receives signals indicative of placement locations of a source and plurality of sinks for a network of a placed integrated circuit, selects Steiner tree points from a plurality of Hanan points defined by the placement locations based on a cost function associated with post buffer delay of the network, and outputs signal routes between the source and sinks based on the selected Steiner tree points.

A method for constructing an integrated circuit interconnect tree topology includes receiving signals indicative of placement locations of a source and plurality of sinks for a network of a placed integrated circuit, selecting Steiner tree points from a plurality of Hanan points defined by the placement locations based on a cost function associated with post buffer delay of the network, and outputting signal routes between the source and sinks based on the selected Steiner tree points.

A computer readable medium has instructions stored thereon that, when executed by a processor, cause the processor to perform operations of receiving signals indicative of placement locations of a source and plurality of sinks for a network of a placed integrated circuit, selecting Steiner tree points from a plurality of Hanan points defined by the placement locations based on a cost function associated with post buffer delay of the network, and outputting signal routes between the source and sinks based on the selected Steiner tree points.

BRIEF DESCRIPTION OF THE DRAWINGS

FIG. 5 is a schematic diagram of macro blocks and clusters of standard cells with free space channels there between.

DETAILED DESCRIPTION

I. Introduction

Figure 1:
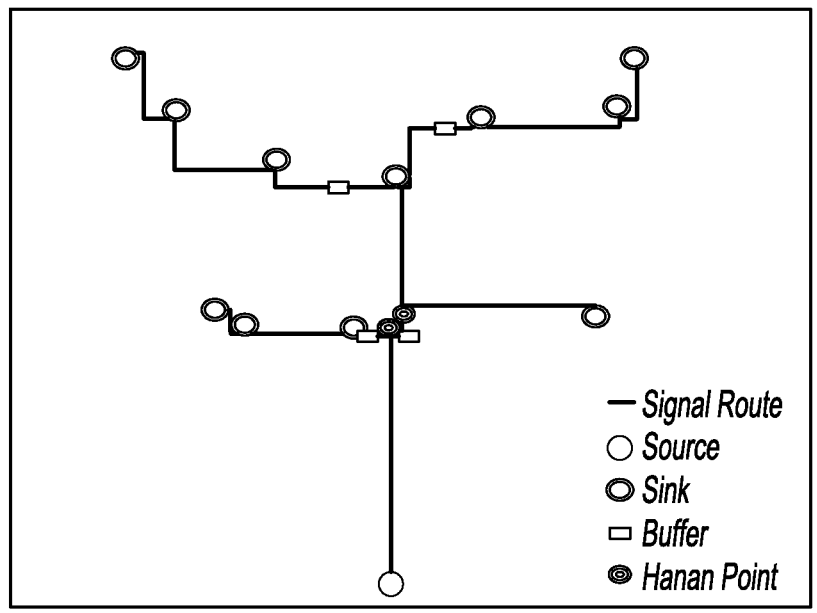
FIG. 1 is a schematic diagram of a RSMT for a net requiring four buffers.

Recognizing the impact of buffers in the sink criticalities, and the complexity of Steiner tree construction and buffering for high fan-out nets (especially in the presence of widely varying timing and polarity requirements at various sinks), a C-tree algorithm adopting intelligent clustering heuristics to obtain better buffer positions and better timing performance has been proposed. An interesting iterative approach using incremental tree modifications using non-Hanan shifting and Hanan grafting moves has also been described. A dynamic optimization technique for constructing topology and buffering concurrently starts at the sinks and moves toward the source, constructing numerous solutions in terms of partial trees of buffers and tree segments, identifying and pruning most likely suboptimal partial tree solutions. Additional concurrent buffering and Steiner tree topology techniques can be found in the literature. Since the input slews to be used for buffers are not known before completing the construction of the entire topology, backward propagation of timing and the quality of buffering suffer from inaccuracies. Critical trunk based "buffer-aware" Steiner tree construction has also been described. The technique reports significant improvement in performance metrics, especially for the critical sink. However, it is usually difficult to ascertain the criticality of sinks without knowing the topology, buffer sizes, and locations. Actual global/detail routing among already routed power/ground/clock nets and other signal nets may change the optimality metric of the results of both Steiner tree and buffering. Layer-by-layer congestion aware global/detail routing may change the topology from the initial one by introducing routing detours and also may change the metal layer (and associated RC) assumptions. It may be helpful to have accurate layer-by-layer routing congestion during topology construction.

This detailed description introduces BI1S-CB (Batch Iterated 1-S with Concurrent Buffering), an algorithm for solving the complex problem of Steiner tree construction and buffering for certain long and high fan-out nets in large multi-GHz microprocessors. Timing criticality of these nets in addition to the need for multiple buffers in each net make these nets special targets for timing optimization. This detailed description also demonstrates that certain good constructive algorithms for RSMT, such as BI1s for selecting Steiner points (from a pool of Hanan points), can be modified for concurrently constructing a routing topology and buffering. The known effectiveness of BI1S and certain newly introduced pruning techniques help minimize the run time. In this method, the basic algorithm for MRST is integrated at its core with practical industrial packages for (a) spanning tree construction aware of layer-by-layer routing congestion, (b) RC extraction and (c) buffering. We also augment the list of Hanan points with strategically placed limited non-Hanan points to improve the quality of solutions. The traditional wire-length or pre-buffer timing cost is replaced with a weighted sum of post-buffer timing, buffer count, and power for the desired trade-off. The presented results on difficult industrial test nets show that the method is extremely effective in optimizing post-buffer timing. Timing improvements amounting to more than 25% of cycle time at 4 GHz is noticed in a single net.

This detailed description further introduces a new class of Steiner tree. Modern large chips are partitioned into so-called plan groups (large hierarchical blocks/units, hence forth called super units) to avoid very long run time during routing. This partitioning imposes a new restriction that a cross super-unit net is limited within two adjacent super units and can cross the boundary only once. We provide an elegant solution for this single crossing requirement, which is seamlessly integrated with our BI1S-CB algorithm. Experiments demonstrate that, compared to the traditional sequential steps of RSMT construction, routing and buffering in each net we have tested (in both classes of Steiner trees), we significantly improve the critical delay (and also the sum of delays).

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the teachings of the disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. The present disclosure may utilize various spatial references, such as "top," "bottom," "left," "right," "upper," "lower," etc. which generally refers to the particular figure and is not intended to limit any embodiment. These spatial references, any references to shapes, and any references to the numbers of components that may be utilized are merely used for ease of description and illustration of representative embodiments and should not be construed in any limiting manner.

Various embodiments include a computer-implemented method for constructing a topology or tree for an integrated circuit, such as a microprocessor. The method may be performed by a programmed microprocessor or computer. While illustrated as one microprocessor or computer, the method may be implemented by two or more computers or microprocessors, which may communicate with one another over a bus or over a local or wide area network, such as the Internet, for example. It should therefore be understood that references to a computer or microprocessor programmed or configured to perform particular steps or functions may include two or more computers or microprocessors cooperating to implement the logic, program, or algorithm of the representative embodiments. The computer(s) or microprocessor(s) may communicate with various types of non-transitory or persistent computer readable storage devices, media, or and/or memory. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the computer(s) or microprocessor(s) in constructing a topology according to the present disclosure.

The logic, functions, programs, or algorithms of various embodiments may be represented by flow charts or similar diagrams in one or more figures. These figures provide representative strategies and/or logic that may be implemented using one or more processing strategies that may include parallel processing, multi-tasking, multi-threading, and the like. As such, various functions illustrated may be performed in the sequence illustrated, in parallel, or in some cases omitted. Although not always explicitly illustrated, one of ordinary skill in the art will recognize that one or more of the illustrated functions, routines, or procedures may be repeatedly performed depending upon the particular processing strategy being used. Similarly, the order of processing is not necessarily required to achieve the features and advantages described herein, but is provided for ease of illustration and description of the representative embodiments. The logic or algorithms may be implemented primarily in software executed by a microprocessor-based system. Of course, the logic may be implemented in software, hardware, or a combination of software and hardware in one or more computers or microprocessors depending upon the particular application. When implemented in software, the logic may be provided or stored in one or more computer-readable storage devices or media having stored data representing code or instructions executed by a computer to construct the topology for routing signals in a VLSI device. Although described with reference to VLSI device topology construction, those of ordinary skill in the art may recognize other routing applications for determining routing that satisfies similar criteria. As such, the representative embodiments are not limited to use for VLSI or similar device routing and may be more generally applied to various types of routing problems or applications.

Figure 2:
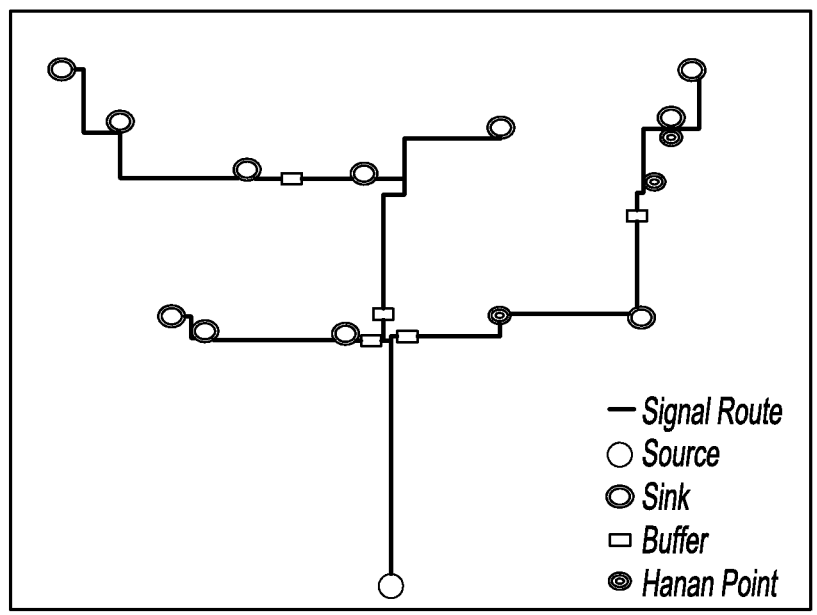
FIG. 2 is a schematic diagram of an alternative Steiner tree having 35% better timing.

In a typical constructive algorithm such as BI1S, Hanan points are evaluated one by one and a sub-set of them are chosen as Steiner points. The Hanan points for a RSMT, however, may lead to undesired post-buffer timing. FIGS. 1 and 2 illustrate this idea. FIG. 1 shows a topology, which is close to a RSMT using the Hanan points (shown as hollow circles). FIG. 2 shows an alternate Steiner tree, which uses a different set of Hanan points selected according to embodiments of the present disclosure. It uses one more buffer and larger wire-length but timing is 35% better. It is not always that more repeaters or buffers and larger wire-lengths are necessary for timing improvements, as will be described herein. Note the location of the Hanan points in FIG. 2. They guide the topology away from the one (with less wire-length) in FIG. 1. Improvement in timing comes from early branching in FIG. 2. However, the present disclosure also recognizes that too many parallel branches could degrade timing.

A more recent issue in Steiner tree topology selection is the lengthy run time for detailed routing of multi-million nets in large chips such as microprocessors. Large run time and data volumes are avoided by partitioning the chip into (super-sized blocks/units) so-called super units (SUs). Detailed routing is done only at the super unit level (and not at the chip level). Inter super-unit nets, thus, must be partitioned into more than one intra super-unit nets. For each inter super-unit net, port locations are identified on the super units. The super units are placed abutted such that the ports on adjacent super units for a single inter super-unit nets are also abutted. This way, routing the super units also routes the inter super-unit nets. However, a net is limited to only two adjacent super units and can cross the boundary between them only once. This single-crossing restriction also implies that an inter super-unit net cannot start in one super unit and fly over to a second super unit (without connecting to any logic cell) and then come back to the starting super unit. These additional restrictions make constructing Steiner tree topologies more complex.

Figure 3:
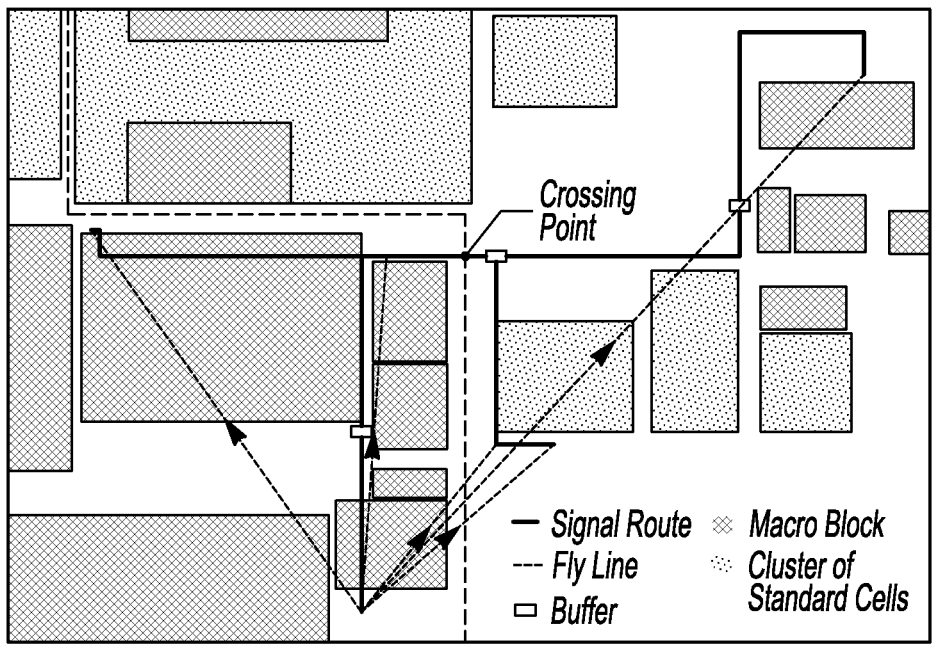
FIG. 3 is a schematic diagram of an inter super-unit net topology using a less than desirable crossing point.
Figure 4:
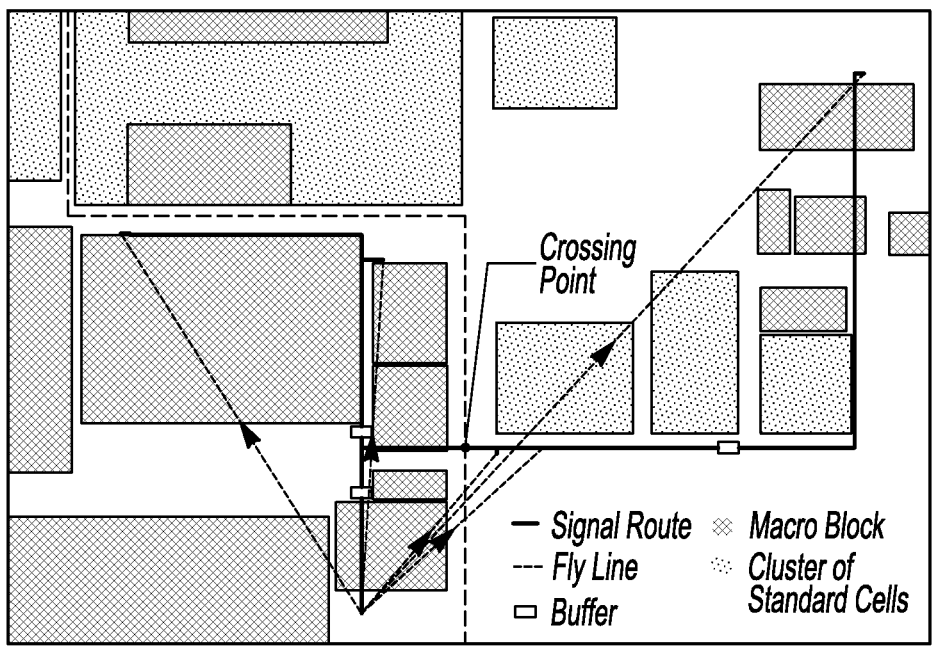
FIG. 4 is a schematic diagram of an alternate Steiner topology concurrently selecting Hanan points, the single crossing point and the buffers for 33% better timing.

FIG. 3 shows a cross super-unit net involving two adjacent super units (dashed line represents boundary between them). Source and sink locations (fixed, based on a placement) can be seen from the fly lines, each of which begins at the source and ends at a sink. Note that it has significantly more wire-length than a MRST. The MRST, as one can see, will have two crossings. FIG. 4 shows an alternate topology, which is 33% better in terms of the critical delay and also better in terms of wire-length. Besides larger wire-length, the topology in FIG. 3 has three buffers in the path from the source to the critical sink while the topology in FIG. 4 has only two buffers in the same path.

As described in greater detail below, various embodiments provide a simple elegant integrated solution to ensure single crossing by a Steiner topology across super unit boundaries. Obstacle avoiding RSMT (OA-RSMT) is one extension to RSMT to avoid the pre-designed IP blocks and macros. Over-the block RSMT (OB-RSMT) has been proposed to properly use the routing resources over the pre-designed blocks to achieve better performance. A representative embodiment according to the present disclosure uses BI1S framework for evaluating multitudes of Hanan (and some non-Hanan) points. Instead of capturing the wire-length as the metric of a topology constructed from a set of Hanan/non-Hanan points, we do an RC extraction of the topology and run a buffering tool. We compute a cost of the topology in terms of buffer count, post-buffer delay values (sum/maximum) in combination with timing slacks (if available) at different sinks, capacitance (reflecting power dissipation in combination with buffer count), etc.

To avoid post global/detail routing surprises, a (layer-by-layer) congestion-aware spanning tree construction may be used. All existing routes (due to power, ground, clocks and other routed nets) are considered in computing an initial capacity for each global routing grid and for all routing layers. The number of routing tracks (width plus spacing of a route on a routing layer) on a layer is the capacity if there are no existing routes. As a route is encountered in a grid and on a layer, the capacity is decreased by one for the grid on that layer.

Congestion based tree construction allows concurrent topology construction and buffering in a post-route phase for incremental timing improvement net by net. The technique can also be used in the pre-route mode for all high-fan-out timing critical nets.

Given the driving pin and sink pin locations, and the locations of the Hanan points to be inserted as candidate Steiner points, we construct a spanning tree to connect all these points. In spanning tree construction, we keep two sets of points. The first set contains the points that are already connected by routes. Initially, this set is empty. The second set consists of all points that are yet to be connected to the tree. Initially, the second set contains all the points and becomes empty at the end of spanning tree construction. At any stage of spanning tree construction, we connect the closest pair of points, one point being in the connected set and the other point being in the unconnected set. A search is made in the global grid graph to obtain the routes to connect the pair of points. The search starts from a point and tries to reach the other point using available capacity at the highest metal layer. Whenever a routing grid is encountered without any capacity on the current highest layer, we go to the next lower layer (through a via, if via capacity is available) with available capacity. Whenever a routing grid without any capacity on any allowed metal layers is encountered, we go back to previously visited routing grids to restart the search in other directions yet to be explored. This process continues until we find routes (with layers) connecting the pair of points. If no route is found (due to congestion), we find the next closest pair of points to connect.

In various embodiments, an RC estimation tool is calibrated with statistical Miller factors, statistical values for spacing between adjacent routes, metal etching effects, dielectric thickness variation, etc. The number of buffers produced in a large design based on this RC estimation is within 1% of the corresponding number with a commercial 3D extraction tool. While some variation of buffer count within a small fraction of the individual nets may occur, the various embodiments seldom invalidate the buffer placement with respect to slew mitigation. A buffer-insertion package may be used in the process and may be custom developed. Alternatively, a commercial available buffer-insertion tool may be used.

Embodiments according to the present disclosure may employ various levels of pruning methods in the basic algorithm of Hanan point selection. In addition, locations may be identified for insertion of non-Hanan points to improve timing. Various techniques may be employed for routing over the blockage and avoid associated slew failures.

Various embodiments according to the present disclosure may include associated advantages. For example, embodiments may provide an accurate method for obtaining a truly timing-driven Steiner tree and associated buffers concurrently. A new class of single-crossing Steiner tree and associated solution integrated with concurrent buffering allows reduced processing time for larger and more complex nets. Similarly, various levels of pruning may be used to improve run time. Embodiments may provide spanning tree construction based on layer-by-layer routing congestion. Alternative L/Z shapes may be evaluated (for routing a segment) for avoiding routing congestion. Various embodiments may identify locations and add non-Hanan branching points. Experimental results demonstrate significant improvements over traditional sequential techniques.

Use of a free-space aware buffering tool in various embodiments assures that buffers can always be legalized. Avoiding routing long distance over placement blockages mitigates slew failures that would result otherwise. The basic BI1S framework and our modifications (BI1S-CB) to deal with concurrent buffering is introduced later. Various levels of pruning to improve run time are also included.

Topics covered herein include 1) an accurate method for obtaining a timing-driven Steiner tree and associated buffers concurrently, 2) a new class of single-crossing Steiner tree and associated solution integrated with concurrent buffering, 3) various levels of pruning to improve run time, 4) spanning tree construction based on layer-by-layer routing congestion (alternative L/Z shapes are evaluated, for routing a segment, for avoiding routing congestion), 5) identifying locations and adding non-Hanan branching points, 6) experimental results showing improvements over traditional sequential techniques, 7) use of a free-space aware buffering tool so that buffers can always be legalized, and 8) avoiding routing long distance over placement blockages so as to mitigate slew failures that would result otherwise.

Section II introduces the basic BI1S framework and our modifications (BI1S-CB) to deal with concurrent buffering. Various levels of pruning to improve run time are also included. This section also elucidates with examples the mechanisms how superior results are discovered during the working of BI1S-CB. Section III presents the new class of single-crossing Steiner tree and its associated modification for BI1S-CB. Section IV introduces the test results.

II. Transformation from BI1S TO BI1S-CB

A. BI1S for Optimal Wire-Length

We first compute the set HP of Hanan points from the locations of the source and the sink pins for the net being considered. A base MST (minimum spanning tree) is constructed from the pins only. The generic BI1S algorithm has an outer Loop and two inner loops: Loop-1 and Loop-2. Loop-1 iterates over the current Hanan points. For each Hanan point, a spanning tree is constructed using the pins, already promoted Hanan points to be Steiner points (initially this list is empty) and this Hanan point. The wire-length of the spanning tree is captured as the cost for this Hanan point. If the cost is less than the base MST cost, the Hanan point is included in a list of candidates considered to be promoted to a Steiner point in Loop-2. If this list is empty at the end of Loop-1, BI1S terminates.

Once Loop-1 is completed, the Hanan points are then sorted in ascending order of cost. Loop-2 considers the candidate for Steiner points (from the sorted list) and adds them one-by-one to the promoted Steiner points if adding the Hanan point reduces the cost. Once Loop-2 is completed, the base MST cost is updated with the lowest cost seen in Loop-2. The promoted Hanan points are removed from the list of Hanan points and outer Loop starts again.

The BI1S step by step is described below. The symbols used are as follows:

$H_p$: List of Hanan points
$T_p$: List of Hanan points to be considered for promoting to Steiner points
$S_p$: List of Hanan points promoted to be Steiner points
$K_b$: Base MST cost
$K_p$: MST cost of a spanning tree which includes the Hanan point "p" being considered
K[p]: A vector storing cost for each Hanan point p
$K_{min}$: Minimum MST cost seen so far BI1S:
1. $K_{min}$=Wire-length for a spanning tree to include only the pins of the net (no Hanan point)
2. Sp=Φ
3. Outer Loop:
   3.1. $K_b$=$K_{min}$
   3.2. $T_p$=Φ
   3.3. Loop-1: for each p∈$H_p$
   3.3.1. $K_p$=Wire-length for a spanning tree if p is added as a Steiner point
   3.3.2. K[p]=$K_p$
   3.3.3. If ($K_p$<$K_b$) {$T_p$←p}
   3.4. If $T_p$=Φ, stop
   3.5. Sort $T_p$ in ascending order of cost
   3.6. Loop-2: for each p∈$T_p$
   3.6.1. $K_{new}$=Wire-length for a spanning tree if p is added as a Steiner point
   3.6.2. If ($K_{new}$<K[p]) and ($K_{new}$<$K_{min}$)
   3.6.2.1. $K_{min}$=$K_{new}$
   3.6.2.2. $S_p$←p
   3.7. Delete the points in $S_p$ from $H_p$
   3.8. Repeat step 3

B. BI1S-CB: Modifications for Concurrent Buffering

We replace the cost of a spanning tree from wire-length to a more comprehensive cost. Once the spanning tree is constructed in steps 1, 3.3.1 and 3.6.1, we use RC estimation. For the RC estimation to work, we need to know the metal layer(s) on which we are routing each segment. Usually, we are given a set of metal layers (some of which are for horizontal routes and the others for vertical segments). To compute layer-by-layer routing congestion, we read a "def" file containing all routes for power, ground, clock and already routed signal nets and pin shapes. We also use track information usually used by a detail router. On a coarse grid we compute un-used tracks in each grid. The number of un-used tracks supply the congestion picture. We also read the via shapes in computing un-used tracks in each metal layer. We prune the Hanan points which are in highly congested areas.

When constructing the spanning tree, we are usually connecting a point (pin or candidate Steiner point) from the set of already connected points to the set of unconnected points. We select the pair of points that are "closest." In the traditional wire-length based methods, the Manhattan distance between the points is used to find the closest points. We change this definition to consider the RC using the highest layer(s) available (not congested) for the point pair. When the pair of points to be connected are not on a straight line, we try alternate L shapes and a few Z-shapes to find the lowest "distance" (in terms of RC) route. The route shapes selected are stored as routing segments and used to connect to the next "nearest" point. The "distance" may not be point to point, from one point to the other. It is so only when the point to be connected is not nearer to one of the segments already in the segment list. In computing distance and generating a segment for the spanning tree, we are thus introducing candidate Steiner points which may not be in the list of Hanan points. Once the spanning tree is selected as a lower cost tree, we also promote these candidate Steiner points to be Steiner points.

Figure 5:
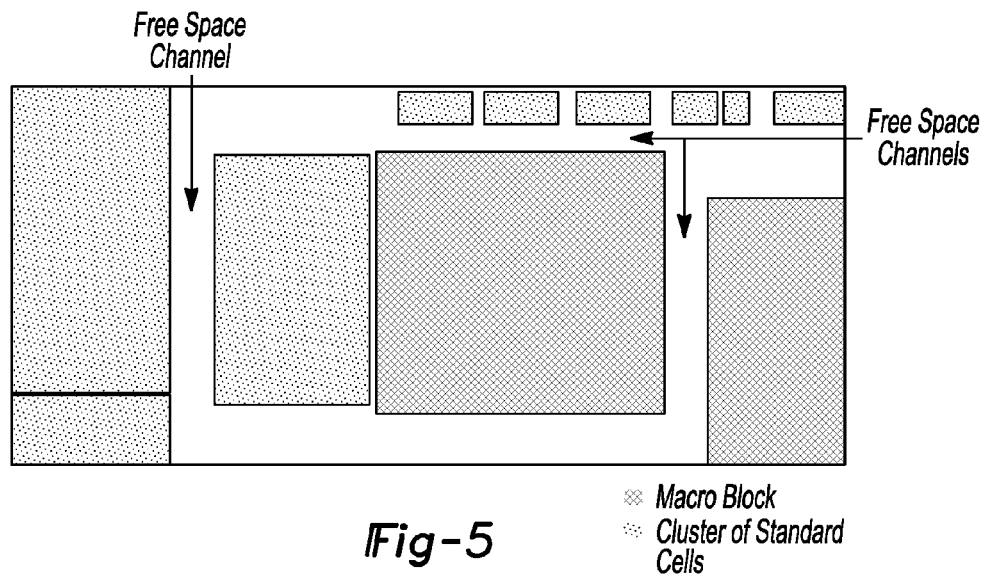
Figure 6:
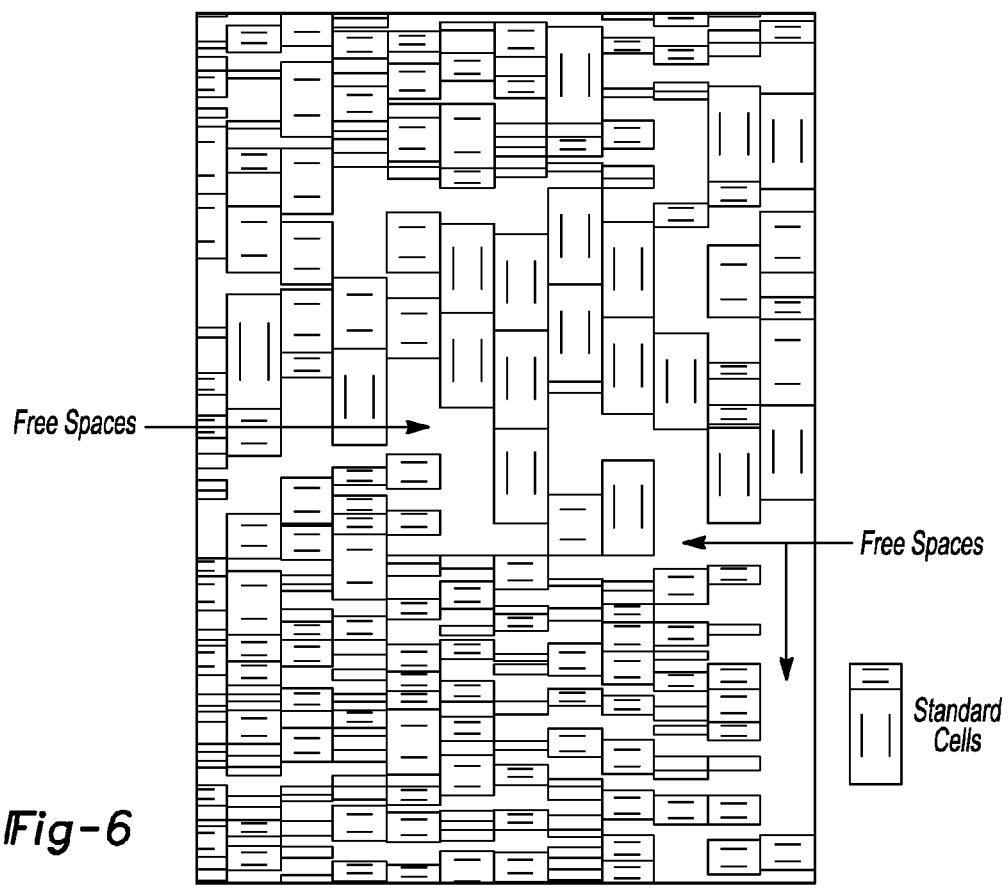
FIG. 6 is a schematic diagram of vertical columns of standard cells with free spaces.
Figure 7:
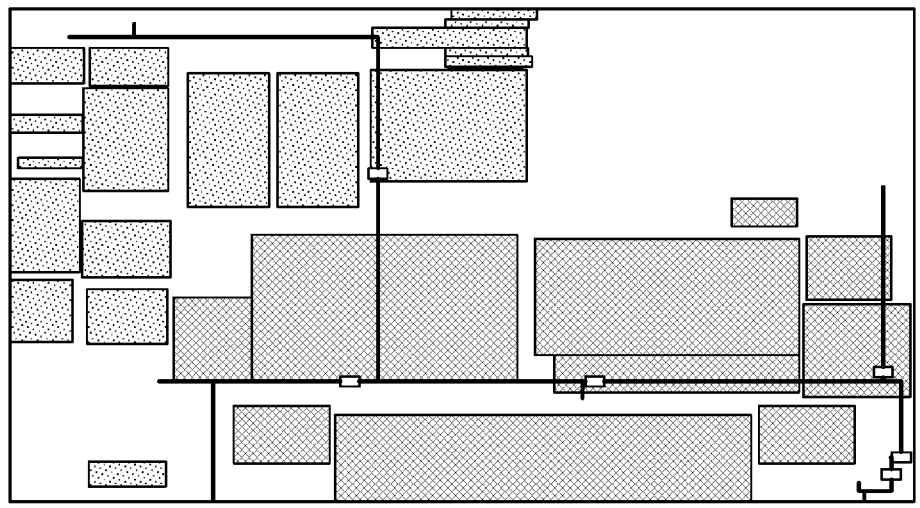
FIG. 7 is a schematic diagram of a topology which facilitates buffer placement on macro blocks, which is not acceptable.
Figure 8:
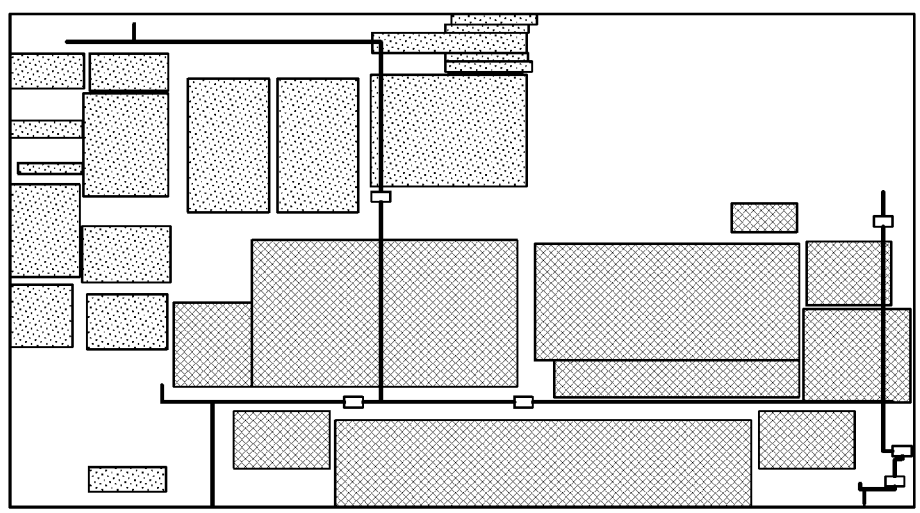
FIG. 8 is a schematic diagram of a topology which facilitates buffer placement in free spaces, which is acceptable.

Once the RC estimation of the spanning tree is complete, we call a buffering routine to buffer the tree. Usually maximum and minimum slew constraints are to be satisfied by the buffers. The tool takes sink slacks (if available) into account. The buffering tool also constructs and uses a map of the free spaces to drop the buffers in areas where it will be easier to be legalized. FIG. 5 shows free space channels between larger macro cells and clusters of smaller standard cells. Buffers can use the free space channels. In addition, there are free spaces within the clusters of standard cells as shown in FIG. 6. FIG. 7 shows a topology for a net which is sure to fail the maximum slew constraint due to lack of free spaces along a long segment of the topology. FIG. 8 shows an alternative topology that allows placement of buffers in free spaces and thus, the combined topology/buffering solution is acceptable.

We take a weighted sum of the maximum (buffered delay), sum of the delays to the sinks, number of buffers, and capacitance. The weight for each item can be adjusted based on the criticalities of the sinks. For a highly critical net, we reduce the weight on capacitance (which measures power) and the weight on the number of buffers. However, it is important to reduce the number of buffers as each buffer is costly to hook up from the lower level metal pins (on the buffers) to the higher level metal routes. Thus, the cost k of a topology and its associated buffer solution is given by $$k = \gamma * B + \eta * Cint + a * D_m + \beta * \sum_{j=0}^{n} D_j$$

where B is the number of buffers, Dj is the delay from the source to the sink j, Dm is the maximum delay over all sinks in the net, Cint is the interconnect capacitance of the net, and α, β, γ, and η are the weighting factors. Another way of defining cost is to add area (power) due to the buffers, again with an appropriate weighting factor.

We can also add a cost to reflect the routing congestion so as to make the net to be routed more easily by a detail router. With the cost of a spanning tree changed from wire-length to one reflecting post-buffer timing and appropriate trade-off for power and buffer count, the BI1S-CB will only select the Hanan points to reduce the cost we have defined.

With regard to FIG. 7, which is a topology that passes over macro blocks for a significant length, buffer placement here is un-aware of free space availability. Thus, the combined topology/buffering solution is not acceptable. Free space aware buffering in this situation will not meet the maximum slew constraint and thus this topology is not an acceptable solution.

Figure 9A:
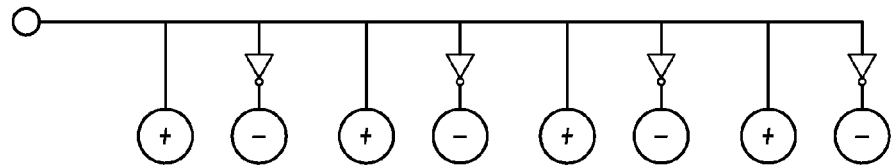
FIG. 9A is a schematic diagram of four inverters being used for four inverted sinks.
Figure 9B:
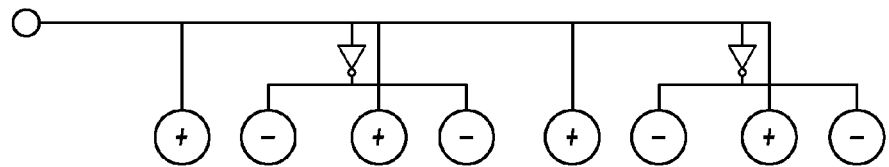
FIG. 9B is a schematic diagram of two inverters being used for four inverted sinks with additional interconnects.
Figure 9C:
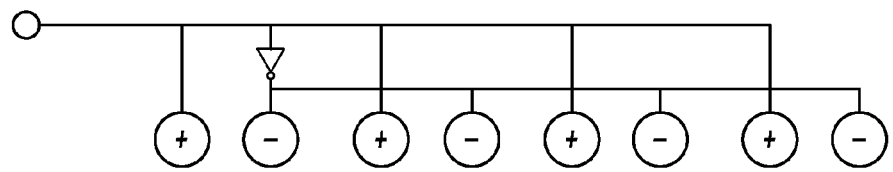
FIG. 9C is a schematic diagram of four inverted sinks being connected to a single inverter with additional interconnects.

The buffering tool also takes sink polarities (inverting or non-inverting) as inputs. If the set of non-inverting sinks is not empty, we need at least one inverter in the buffer library so that the buffering tool can judiciously place inverters at proper places to guarantee inverted polarities for the specified sinks Depending on the cost function and associated weight of buffers (or inverters) and interconnect (capacitance), we may prefer to use more inverters or more interconnects. FIG. 9A shows connecting 4 non-inverting sinks and 4 inverting sinks to a driver. In FIG. 9A, we use 4 inverters. If the cost of inverters is relatively high, we can trade-off 2 inverters for more interconnects as in FIG. 9B, or we can trade-off 3 inverters for even more interconnects as in FIG. 9C. Based on the cost function, our algorithm will automatically provide the best-cost solution.

Run time increases from the basic BI1S as we are doing RC extraction and buffering for each spanning tree. To reduce the run time we employ several levels of pruning Hanan points:

1. Pruning Hanan points based on routing congestion.
2. We keep a list of Hanan points already considered in Loop-1 as well as in Loop-2. If the next Hanan point to be considered is close (within a pre-defined distance), we do not process it.
3. We add the candidate Steiner points identified during the spanning tree construction for the pruning in step 2.
3. Since we are aware of the RC of the segments of a spanning tree, we keep a sum of C (Csum) for all segments in the tree. If the Csum for a tree just constructed is larger than a pre-defined factor multiplied by the best Csum we have seen, the tree is discarded and not processed for buffering.
4. We compute the delays (sink slews) for the un-buffered tree (using a reduced order model for interconnects and a method for computing gate delay). If the maximum delay (the maximum slew) is larger than a pre-defined factor multiplied by the best delay (best slew) we have seen so far, we discard the spanning tree and do not buffer the spanning tree.

We will provide an updated step by step description of the BI1S-CB algorithm in the next section along with integration with the single-crossing Steiner concept.

C. Intricacies of BI1S-CB in Intelligent Hanan Point Selection

Figure 10:
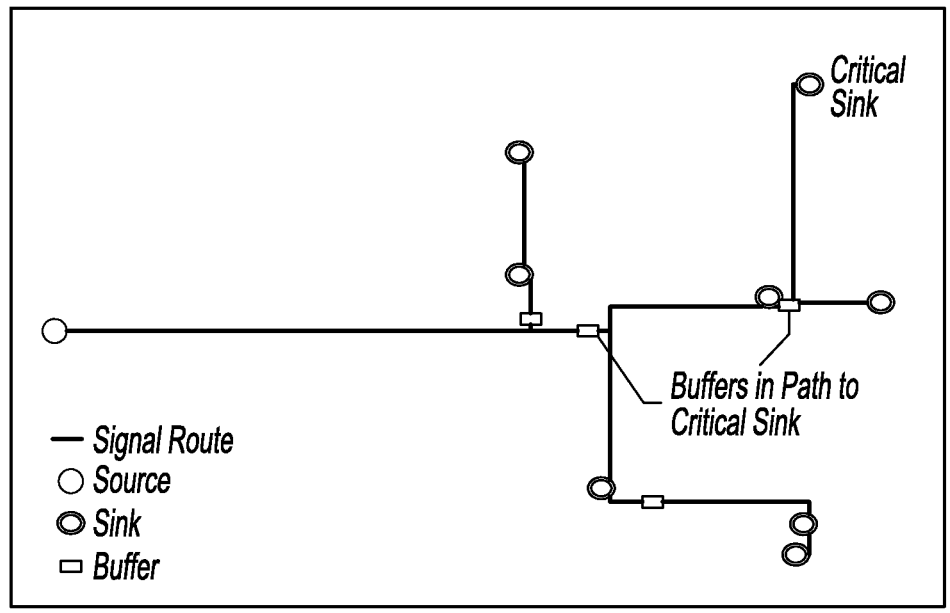
FIG. 10 is a schematic diagram of two buffers in series in the path to the critical sink.
Figure 11:
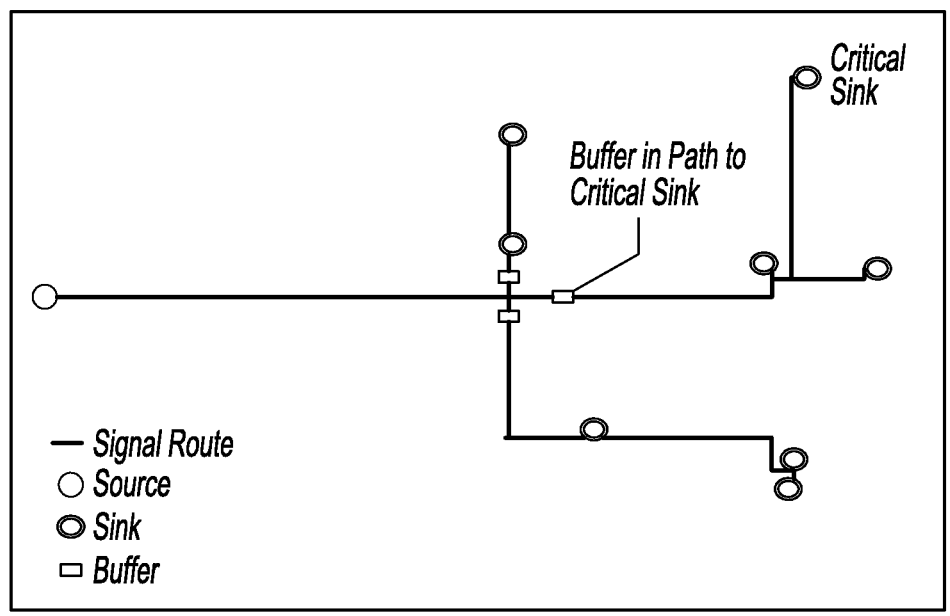
FIG. 11 is a schematic diagram of only one buffer in the path to the critical sink improving timing by 18%.
Figure 12:
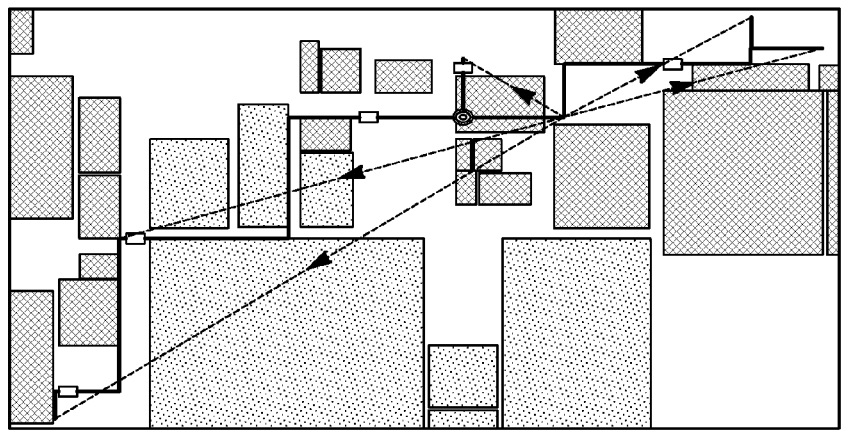
FIG. 12 is a schematic diagram of a RSMT topology using one Hanan point.
Figure 13:
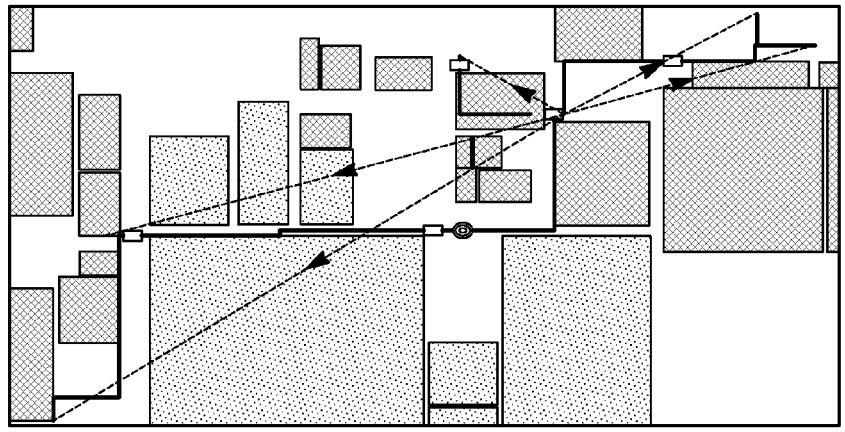
FIG. 13 is a schematic diagram of an isolated cluster of sinks and reduced buffer count in the critical path facilitated by the use of a different Hanan point. Timing improvement is 26%.

We have seen that Hanan points can be selected intelligently to improve timing (FIG. 2). The situation in FIG. 2 imposes early branching, and improves post-buffer timing at the expense of increasing the wire-length and buffer count. At times, we have seen that branching later can also help timing improvement. At other times, selection of alternate Hanan points results in relocating multiple series buffers into parallel ones, improving timing. FIGS. 10 and 11 demonstrate this situation. The improvement of timing happens even though the buffer count is reduced by one in FIG. 11. Use of buffers to isolate a cluster of sinks from the path to the critical sinks combined with reducing buffer count in the path is facilitated by a slight change in the topology. FIGS. 12 and 13 illustrate this point. Timing improvement is 26%.

There are perhaps many other situations with respect to Hanan point selection resulting in timing improvements. The BI1S-CB algorithm will identify good solutions in all these known and other unknown situations.

D. Adding Targeted Non-Hanan Points

Figure 14:
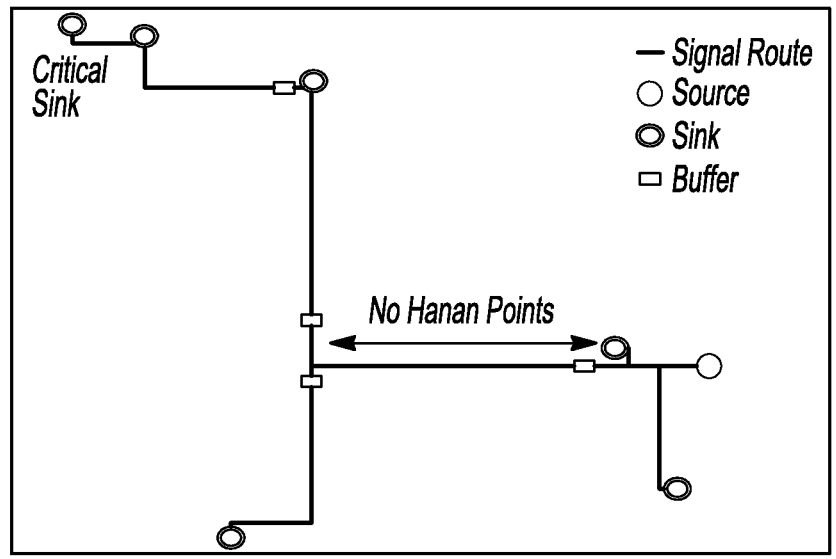
FIG. 14 is a schematic diagram of a MRST requiring 4 buffers, 3 of which appear in the path to the critical sink at the upper left.
Figure 15:
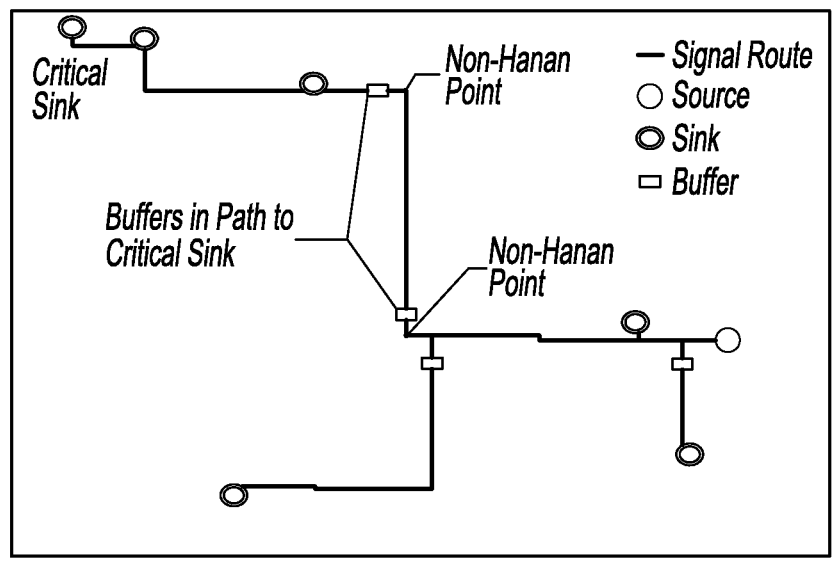
FIG. 15 is a schematic diagram of a Steiner tree with two non-Hanan points; only two repeaters in the path to the critical sink reduce the critical delay by 17%.

At times, there might be locations where Hanan points are not available at all. We can detect such locations and introduce additional non-Hanan points to improve timing. FIGS. 14 and 15 illustrate this situation. Note that there is no Hanan point for this net in the range shown by the arrowed line. FIG. 15 shows the topology when non-Hanan points are added in strategic locations.

Note that a single non-Hanan point in isolation may not produce the desired result in changing the topology. Multiple non-Hanan points are needed to guide the Prim's algorithm in constructing a desired MST. In the case of FIG. 15, we needed at least two non-Hanan points, one close to the two buffers in the middle and one close to the buffer at the top. Even before constructing spanning trees, we can identify long routing segments (popularly called "spines"), which are used to (ultimately) connect to multiple pins. We check for availability of Hanan points along the run of the spines. We add non-Hanan points at regular intervals and in multiple numbers to guide the spanning tree construction using those non-Hanna points.

There are other situations in terms of buffer locations, branching points and post-buffer slack and slew values to determine the locations where non-Hanan points can help. We can construct a buffered Steiner tree using just Hanan points and then inspect the buffered solution to arrive at certain strategic locations for non-Hanan points. Then we can redo BI1S-CB with the limited non-Hanan points to improve the topology.

E. Accuracy of RC Extraction

We carefully calibrated the RC extraction tool for timing convergence. Several factors provide accuracy. First, we use industry standard latest technological issues such as metal etching effects, density effects, etc. Second, we noticed that the power/ground rails do not use wider metals (due to sagging effects). Thus, the power/ground wires are more distributed. On higher metal layers, the number of available tracks between adjacent power/ground lines is limited to a few. Thus, Miller factors for signal lines can be forecasted very accurately. Third, we extracted a taped-out design using an industry-strength 3D extraction tool and our extractor. We partitioned all signal routing shapes into various metal layers. The RC numbers are then obtained for all individual metal shapes on all metal layers. We then formulated and solved an optimization problem to reduce the variation of RC between the two tools. The optimization problem provided us with layer-by-layer adjusting mechanisms for both R and C. As mentioned in the introduction, we obtained excellent results as per the buffering outcome.

III. Single-Crossing Steiner Trees

As mentioned in the introduction, the chip is partitioned into abutting super units with ports defined at the super-unit boundaries for each net entering or exiting a super unit. There are ports for communicating to the world external to the chip. Since no routing is done at the chip level, we need to define additional ports for cross super-unit nets. For architectural reasons, each net in a super unit can have only one port (either input or output). This requirement of a single port for a net implies that a cross super unit net cannot involve more than two super units and the two super units must share a common boundary. This requirement also implies that a cross super-unit net can cross a super unit only once. It cannot fly over a super unit (without connecting to any logic cells). There will be two abutting ports at the crossing point, one port per each super unit. We have shown in FIGS. 3 and 4 that crossing point selection has significant impact on timing and wire-length. We operate at the chip level to determine the single crossing point and the topology of the net and buffers to be placed, all concurrently. We then define ports at the super units at the crossing point, and push down the topology and buffers to the respective super units. Thus, the detail routing at the chip level is avoided.

Figure 16:
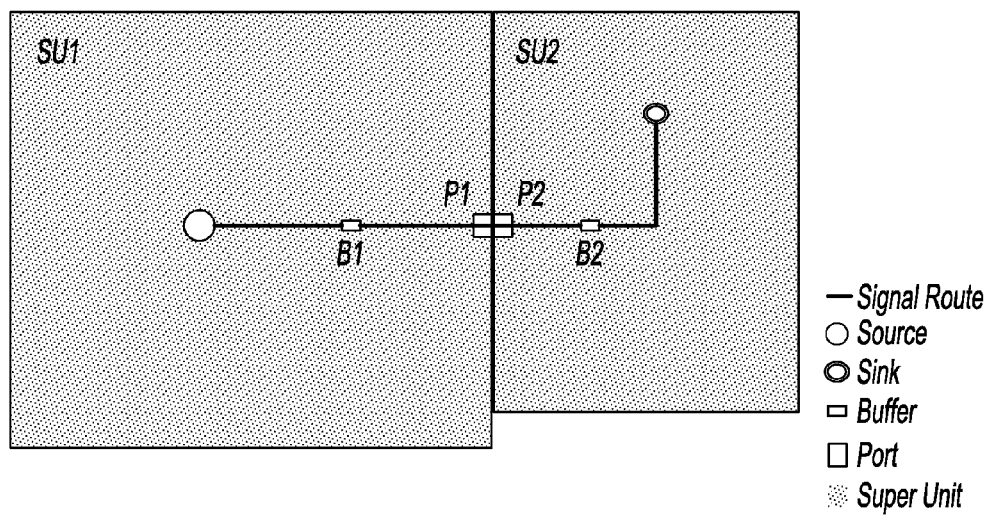
FIG. 16 is a schematic diagram of a cross super-unit net, route, buffers and ports.

FIG. 16 shows two super units SU1 and SU2 placed abutted in a chip. A cross super-unit net has a source in SU1 and a sink in SU2. The topology, buffers (B1 and B2) and the crossing point (where ports P1 and P2 are located) for the net will be the outcome of BI1S-CB. Ports P1 and P2 will be instantiated in super units SU1 and SU2, respectively (note that they will be abutted). Routes from the source in SU1 to the port P1 will be placed in SU1. The route from P2 to Sink will be placed in SU2. Buffer B1 will be instantiated in SU1 and B2 in SU2.

BI1S-CB as described in the previous section may not guarantee the single crossing requirement. Inspecting the positions of the source and the sinks in two super units in FIG. 4, one can easily see that a MRST would involve two crossings.

We have at least two distinct contributions with respect to BI1S-CB for single-crossing Steiner trees. The first is about how to construct a MST given the pins of the net and the Steiner candidate points. The second contribution is related to making evaluating Hanan points more efficient.

It is easy to see that with only one crossing, the overall spanning tree is partitioned into two spanning sub-trees, each confined in one super unit. The crossing segment must be connecting a pair of points (pins/Hanan point), one from each portion, such that the length of the crossing segment is the shortest possible. It is also easy to see that each spanning tree confined within a super unit is a MST for the points being connected within the super unit. If it is not a MST, then we can reduce the length of the overall spanning tree by making it a MST.

We can avoid partitioning the pins and Hanan points into two sets simply by assigning a super-unit ID for each global routing node, based on which super unit it is located in. In evaluating distance between points, we check if both points are within a super unit. In that case, the length is the usual distance. If not, we add a crossing cost (which is a very high number) with the actual distance. The spanning tree construction thus avoids crossing by keeping on connecting points within the same super unit. Once all points in a super unit are connected, it must then use a crossing branch to go to the second super unit. Then, it never crosses again to the first super unit to avoid adding high crossing cost more than once. The crossing cost does not need to be larger than the cost of the complete MST. So a reasonably high number works. However, dividing the pins and the Hanan points into two partitions makes the spanning tree construction more efficient because we do not need to keep on computing cost of connecting pairs of points located in two separate super units.

The efficiency in constructing a spanning tree is utilized for speeding up the BI1S-CB-SC (for single crossing) algorithm presented shortly. Assigning a super-unit ID to each global routing node is also needed to confine routing for connecting the pins within a super unit to be within the super unit and to not use a second super unit as fly over.

F. BI1S-CB-SC (for Single Crossing)

Note the notations for BI1S in Section II. Assume we have two super units SU1 and SU2, and that some multiplication factors α and β (as used below) for pruning Hanan points are given:

1. Divide the pins of the net into two partitions: $P_1$ in SU1 and P2 in SU2
2. Divide the Hanan points into two partitions: $H_{p1}$ and $H_{p2}$
3. $K_{min}$=construct a spanning tree to include only the pins of the net (no Hanan point). Store $MST_1$ in SU1, $MST_2$ in SU2 and the two points ($p_{c1}$, $p_{c2}$) being connected by the crossing segment. Let $S_{mst}$ be the additional Steiner points created during the construction of the spanning trees. Call RC extraction and buffering, compute the post-buffer cost and return that as $K_{min}$.
4. Sp=Φ
5. Capacitance $C_{best}$=capacitance of the MST in step 3, Delay $D_{best}$=maximum post-buffer source to sink delay
6. Outer Loop:
   6.1. $K_b=K_{min}$
   6.2. $T_p=Φ$
   6.3. $H_{processed}=S_{mst} \cup P_1 \cup P_2$
   6.4. Loop-1: for each $p \in H_p$
      6.4.1. If (p is within the distance $d_{near}$ (given) to any point in $H_{processed}$) skip point p, process the next Hanan point, else go to next step
      6.4.2. If p in $H_{p1}$, redo $MST_1$, else redo $MST_2$
      6.4.3. Identify the points to be connected for crossing segment ($p_{c1}$, $p_{c2}$): closest point-pair across the boundary
      6.4.4. Complete MST=$MST_1 \cup MST_2 \cup$ segment ($p_{c1}$, $p_{c2}$)
      6.4.5. Extract RC for the MST using the appropriate metal layer for each segment
      6.4.6. If ($C_{MST}>α*C_{best}$) skip the point p; If ($C_{MST}<C_{best}$) {$C_{best}=C_{MST}$}
      6.4.7. Compute the pre-buffer critical delay D; If (D>β*$D_{best}$) skip p; If (D<$D_{best}$) {Dbest=D}
      6.4.8. Call buffer insertion and compute the cost (K[p]=) $K_p$
      6.4.9. If ($K_p<K_b$) {$T_p \leftarrow p$; $H_{processed} \leftarrow p$}
   6.5. If $T_p=Φ$, stop
   6.6. Sort $T_p$ in ascending order of cost
   6.7. Loop-2: for each $p \in T_p$
      6.7.1. $K_{new}$=post-buffer cost for a spanning tree if p is added as a Steiner point
      6.7.2. If ($K_{new}<K[p]$) and ($K_{new}<K_{min}$)
         6.7.2.1. $K_{min}=K_{new}$
         6.7.2.2. $S_p \leftarrow p$
         6.7.2.3. Update $S_{mst}$ and so $H_{processed}$
   6.8. Delete the points in $S_p$ from $H_p$
   6.9. Repeat step 3

We have an efficient mechanism to identify the shortest crossing segment (step 6.4.3) using:

a. for each spanning tree in each of the two super units, the (x/y) locations of all pins, Hanan (and non-Hanan) points, and the Steiner points added during spanning tree construction,
b. the projection of the points in (a) on the common boundary providing possible crossing points,
c. the sorting of points in (a) to each side of the boundary in ascending order of distance from the boundary, and
d. sorting the crossing points in "y" on a vertical part of the common boundary and in "x" on a horizontal part of the boundary, and
e. moving from one crossing point to the other in the order sorted in (d) and keeping track of the shortest distance and the pair of points (one each side of the boundary). Note that the shortest distance point-pair may involve more than one crossing point, not necessarily adjacent.

IV. Experimental Results

We considered 32 challenging long and high fan-out nets ranging in the number of sinks from 9 to 35. Post-buffering critical delay in each of these nets are compared for (a) RSMT, (b) MRSA and our (c) BI1S-CB (or BI1S-CB-SC) algorithms. The critical delay for each of the cases (b) and (c) is expressed as a ratio against (a). Table 1 lists the critical delay numbers for (b) and (c).

TABLE 1

| MRSA | BI1S-CB | MRSA | BI1S-CB | MRSA | BI1S-CB |
| --- | --- | --- | --- | --- | --- |
| 1.092198582 | 0.872340426 | 0.989417989 | 0.904761905 | 0.969543147 | 0.883248731 |
| 1.026666667 | 0.94 | 1.0 | 0.915789474 | 0.929648241 | 0.698492462 |
| 1.026666667 | 0.946666667 | 0.805263158 | 0.705263158 | 0.785 | 0.595 |
| 1.051282051 | 0.692307692 | 0.852631579 | 0.615789474 | 0.895522388 | 0.706467662 |
| 1.190184049 | 0.914110429 | 0.947643979 | 0.916230366 | 0.768115942 | 0.555555556 |
| 1.012048193 | 0.777108434 | 0.869791667 | 0.677083333 | 0.990384615 | 0.725961538 |
| 1.179640719 | 0.790419162 | 0.849740933 | 0.715025907 | 0.741626794 | 0.550239234 |
| 1.035087719 | 0.754385965 | 0.922680412 | 0.68556701 | 0.781990521 | 0.545023697 |
| 1.110497238 | 0.817679558 | 0.994845361 | 0.819587629 | 0.724299065 | 0.551401869 |
| 0.851648352 | 0.620879121 | 0.963917526 | 0.87628866 | 1.032258065 | 0.769585253 |
| 1.363636364 | 0.898395722 | 0.989795918 | 0.790816327 | 0.96 | 0.76 |
| | | | | Average | Average |

Capacitance for case (b) is almost the same as that in case (a). For case (c), it is 5% higher than in case (a). Similarly, the buffer counts are the same in cases (a) and (b). For case (c), it is 8% higher. Critical delay in case (b) is 96% of that in case (a), while in case (c) it is only 76% of that in case (a). The additional gain of 20% in the critical delay for an 8% increase in buffer count and a 5% increase in the capacitance (interconnect power) is of value in timing convergence. Since the number of large high fan-out nets are only a small fraction of all signal nets, the increase in power or buffer count is insignificant.

V. Recap

Figure 17:
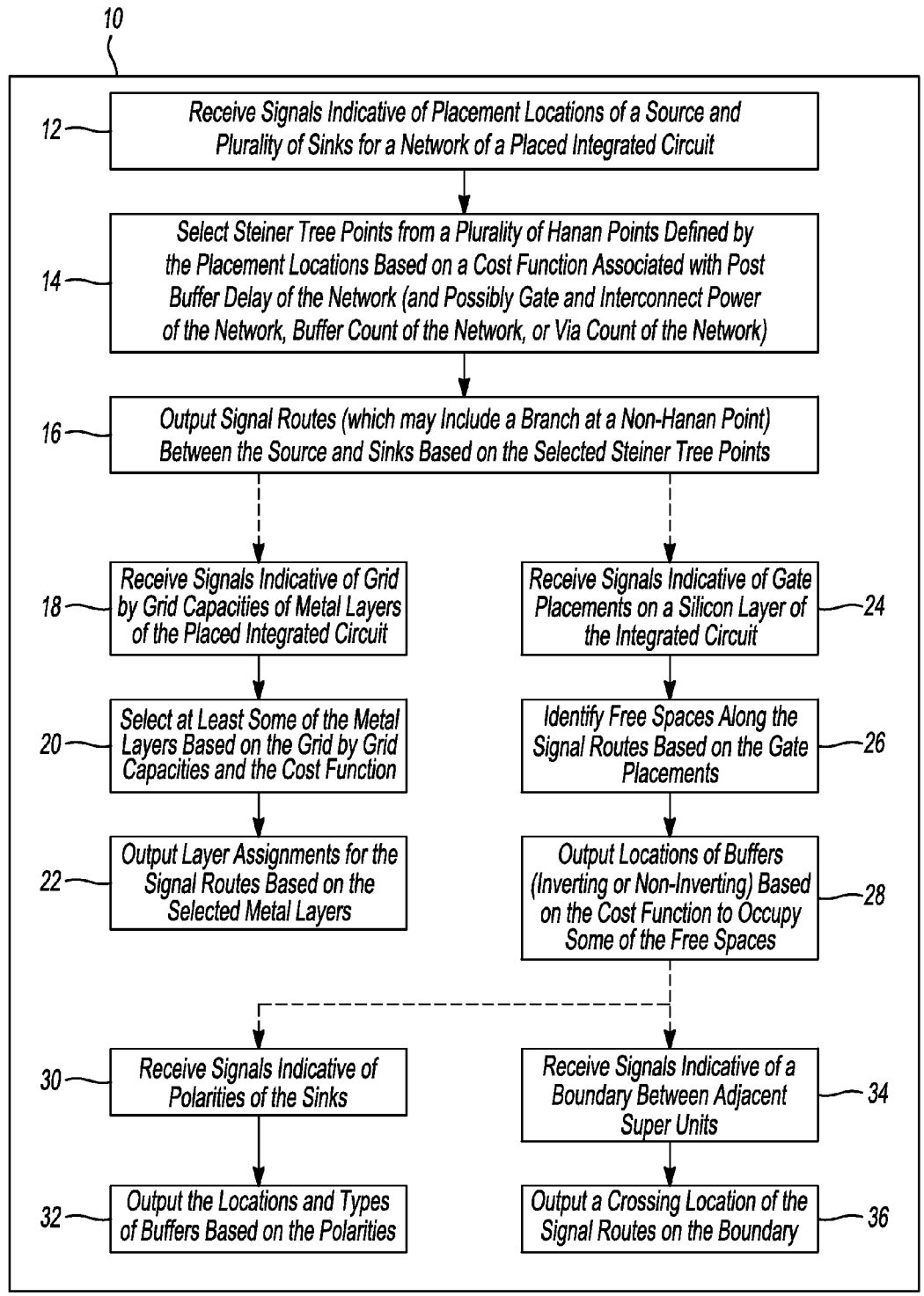
FIG. 17 is a flow chart of algorithms for constructing an integrated circuit interconnect tree topology.

FIG. 17 presents a number of the operations discussed herein in flowchart form. Within the context of microprocessor 10, signals indicative of placement locations of a source and plurality of sinks for a network of a placed integrated circuit are received at operation 12. At operation 14, Steiner tree points are selected from a plurality of Hanan points defined by the placement locations based on a cost function associated with post buffer delay of the network (and possibly gate and interconnect power of the network, buffer count of the network, or via count of the network). At operation 16, signal routes (which may include a branch at a non-Hanan point) between the source and sinks are output based on the selected Steiner tree points. Signals indicative of grid by grid capacities of metal layers of the placed integrated circuit may be received at operation 18. At operation 20, at least some of the metal layers are selected based on the grid by grid capacities and the cost function. At operation 22, layer assignments for the signal routes are output based on the selected metal layer. Signals indicative of gate placements on a silicon layer of the integrated circuit may be received at operation 24. At operation 26, free spaces along the signal routes are identified based on the gate placements. At operation 28, locations of buffers (inverting or non-inverting) are output based on the cost function to occupy some of the free spaces. Signals indicative of polarities of the sinks may be received at operation 30. At operation 32, the locations and types of buffers are output based on the polarities. Signals indicative of a boundary between adjacent super units of the placed integrated circuit may be received at operation 34. At operation 36, a crossing location of the signal routes on the boundary is output.

While various embodiments have been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A system for constructing an integrated circuit interconnect tree topology comprising:
   a microprocessor programmed to
      receive input indicative of placement locations of a source and plurality of sinks for a network of a placed integrated circuit, select Steiner tree points from a plurality of Hanan points defined by the placement locations based on a cost function associated with post buffer delay of the network, and display output indicative of signal routes between the source and sinks based on the selected Steiner tree points,
      receive input indicative of grid by grid capacities of metal layers of the placed integrated circuit, select at least some of the metal layers based on the grid by grid capacities and the cost function, and display output indicative of layer assignments for the signal routes based on the selected metal layers, and
      receive input indicative of gate placements on a silicon layer of the integrated circuit, identify free spaces along the signal routes based on the gate placements, and display output indicative of locations of buffers based on the cost function to occupy some of the free spaces.

2. The system of claim 1, wherein the microprocessor is further programmed to receive input indicative of polarities of the sinks and to display output indicative of the locations based on the polarities.

3. The system of claim 2, wherein the microprocessor is further programmed to display output indicative of types of the buffers based on the polarities.

4. The system of claim 1, wherein the microprocessor is further programmed to receive input indicative of a boundary between adjacent super units of the placed integrated circuit and to display output indicative of a crossing location of the signal routes on the boundary.

5. The system of claim 1, wherein the buffers are inverting or non-inverting buffers.

6. The system of claim 1, wherein the signal routes include a branch at a non-Hanan point.

7. The system of claim 1, wherein the cost function is further associated with gate and interconnect power of the network.

8. The system of claim 1, wherein the cost function is further associated with buffer count of the network.

9. The system of claim 1, wherein the cost function is further associated with via count of the network.

10. A method for constructing an integrated circuit interconnect tree topology comprising:
    by a microprocessor,
       receiving signals indicative of placement locations of a source and plurality of sinks for a network of a placed integrated circuit,
       selecting Steiner tree points from a plurality of Hanan points defined by the placement locations based on a cost function associated with post buffer delay of the network,
       displaying output indicative of signal routes between the source and sinks based on the selected Steiner tree points,
       receiving signals indicative of grid by grid capacities of metal layers of the placed integrated circuit,
       selecting at least some of the metal layers based on the grid by grid capacities and the cost function,
       displaying output indicative of layer assignments for the signal routes based on the selected metal layers,
       receiving signals indicative of gate placements on a silicon layer of the integrated circuit,
       identifying free spaces along the signal routes based on the gate placements, and
       displaying output indicative of locations of buffers based on the cost function to occupy some of the free spaces.

11. The method of claim 10 further comprising receiving signals indicative of polarities of the sinks and displaying output indicative of the locations based on the polarities.

12. The method of claim 11 further comprising displaying output indicative of types of the buffers based on the polarities.

13. The method of claim 10 further comprising receiving signals indicative of a boundary between adjacent super units of the placed integrated circuit and displaying output indicative of a crossing location of the signal routes on the boundary.

14. A non-transitory computer readable medium having instructions stored thereon that, when executed by a processor, cause the processor to perform operations of receiving signals indicative of placement locations of a source and plurality of sinks for a network of a placed integrated circuit, selecting Steiner tree points from a plurality of Hanan points defined by the placement locations based on a cost function associated with post buffer delay of the network, displaying output indicative of signal routes between the source and sinks based on the selected Steiner tree points, receiving signals indicative of grid by grid capacities of metal layers of the placed integrated circuit, selecting at least some of the metal layers based on the grid by grid capacities and the cost function, displaying output indicative of layer assignments for the signal routes based on the selected metal layers, receiving signals indicative of gate placements on a silicon layer of the integrated circuit, identifying free spaces along the signal routes based on the gate placements, and displaying output indicative of locations of buffers based on the cost function to occupy some of the free spaces.

* * * * *

UNITED STATES PATENT AND TRADEMARK OFFICE
CERTIFICATE OF CORRECTION

PATENT NO. : 9,552,454 B2
APPLICATION NO. : 14/603696
DATED : January 24, 2017
INVENTOR(S) : Chowdhury et al.

Page 1 of 1

It is certified that error appears in the above-identified patent and that said Letters Patent is hereby corrected as shown below:

In the Specification

In Column 1, Line 32, after "sinks" insert -- . --.

In Column 9, Lines 60-62, delete " $k = \gamma * B + \eta * Cint + a * D_m + \beta * \sum_{j=0}^{n} D_j$ " and insert -- $k = \gamma * B + \eta * Cint + a * D_m + \beta * \sum_{j=0}^{n} D_j$ --, therefor.

In Column 10, Line 21, after "sinks" insert -- . --.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*